United States Patent [19]
Reed

[11] Patent Number: 5,852,626
[45] Date of Patent: Dec. 22, 1998

[54] GEOMETRY FOR CYLINDRICAL SHAPED LASER SYSTEM GAIN MEDIUM

[75] Inventor: Edward D. Reed, Sunnyvale, Calif.

[73] Assignee: Coherent, Inc., Santa Clara, Calif.

[21] Appl. No.: 903,669

[22] Filed: Jul. 31, 1997

[51] Int. Cl.[6] ...................................... G01S 3/08
[52] U.S. Cl. .............................. 372/103; 372/39; 372/40; 372/69; 372/70; 372/98; 372/109
[58] Field of Search ................... 372/6, 39, 40, 372/66, 69, 70, 92, 98, 103, 109

[56] References Cited

U.S. PATENT DOCUMENTS

| | | | |
|---|---|---|---|
| 3,684,980 | 8/1972 | Kay | 372/66 X |
| 3,958,188 | 5/1976 | Fletcher et al. | 372/66 X |
| 4,513,421 | 4/1985 | Welch | 372/24 |
| 4,914,671 | 4/1990 | Yagi et al. | 372/103 |
| 5,084,889 | 1/1992 | Tajima | 372/39 |
| 5,237,576 | 8/1993 | DiGiovanni et al. | 372/6 |

Primary Examiner—Brian Healy
Attorney, Agent, or Firm—Limbach & Limbach L.L.P.

[57] ABSTRACT

A cylindrically shaped gain medium for a laser resonant cavity. The gain medium has an outer cylindrical side surface and two opposing end faces. An annular groove is formed in the side surface. An energy source excites the gain medium to create a laser beam inside the cavity. The laser beam passes longitudinally through the gain medium. The annular groove defines an annular aperture inside the gain medium for the laser beam. The annular aperture has a diameter that is smaller than a diameter of the side surface and the end faces.

11 Claims, 3 Drawing Sheets

GEOMETRY FOR CYLINDRICAL SHAPED LASER SYSTEM GAIN MEDIUM

FIELD OF THE INVENTION

The present invention relates to laser system gain media, and more particularly to an improved geometry for a cylindrically shaped gain medium.

BACKGROUND OF THE INVENTION

It is known to use a cylindrically shaped gain medium (laser rod) in a laser system to generate an optical output. An external energy source, such as a flash lamp, is disposed adjacent to the laser rod to optically excite the gain medium. A laser resonator is formed whereby a pulsed or continuous wave intracavity laser beam is generated and amplified by the excited laser rod as it travels longitudinally through the rod. A portion of the intracavity laser beam is coupled out of the laser resonator to form the laser system optical output. The laser rod end faces are polished and/or coated to efficiently transmit the intracavity beam into and out of the laser rod. For high power laser systems, the excited portion of the laser rod is cooled with a flowing cooling fluid such as water.

It is also known to form an annular chamfer at each end face of the laser rod. The chamfer is an angled annular cut formed between the side surface and the end face. The chamfer prevents sharp edges that can fracture and/or chip and damage the end faces.

For efficient intracavity beam amplification, the intracavity beam fills most of the laser rod's cross-sectional area. For high power laser systems, it is important for the intracavity beam not to hit or clip the edge between the end face and the side surface, and/or any chamfer portion. High power intracavity beams can damage the laser rod end faces in a matter of seconds by degradation of the rod material at the face edges and/or by throwing debris onto the end faces. This problem is made worse by the fact that the very end portions of the laser rod are typically not water cooled because a seal must be made on the laser rod side surface near each end face to prevent the cooling water from contaminating the rod's end faces.

To prevent laser rod damage, apertures have been used in the laser cavity to prevent the intracavity beam from hitting the end face edges and/or chamfer portions. However, these apertures can wear over time even if the aperture is also water cooled. Further, if the aperture is misaligned to the laser rod, or the resonator is misaligned so that the intracavity beam passing through the aperture hits one of the rod's faces, then the rod can be damaged despite the use of intracavity apertures.

There is a need for a laser rod geometry that will prevent the intracavity beam from hitting the end face edges and/or chamfer portions even if the intracavity beam is misaligned and/or is otherwise aligned to completely fill the laser rod's cross-sectional area.

SUMMARY OF THE INVENTION

The present invention solves the aforementioned problems by providing a gain medium that contains an internal aperture therein to prevent a laser beam passing longitudinally therethrough from hitting the edges of the end faces and/or any chamfer portion.

The improved gain medium geometry for a laser cavity includes an elongated gain medium having an outer side surface and two opposing end faces. An annular groove is formed in the side surface which defines an annular aperture inside the gain medium.

In another aspect of the present invention, a laser system includes resonant cavity, a gain medium inside the cavity, and an energy source. The gain medium is cylindrically shaped and has an outer cylindrical side surface and two opposing end faces. An annular groove is formed in the side surface. The energy source excites the gain medium to create a laser beam inside the cavity. The laser beam passes longitudinally through the gain medium. The annular groove defines an annular aperture inside the gain medium for the laser beam. The annular aperture has a diameter that is smaller than a diameter of the side surface.

Other objects and features of the present invention will become apparent by a review of the specification, claims and appended figures.

DETAILED DESCRIPTION OF THE PREFERRED EMBODIMENTS

The present invention is an improved cylindrical shaped laser cavity gain medium (laser rod) with an integrally formed internal limiting aperture.

Figure 1:
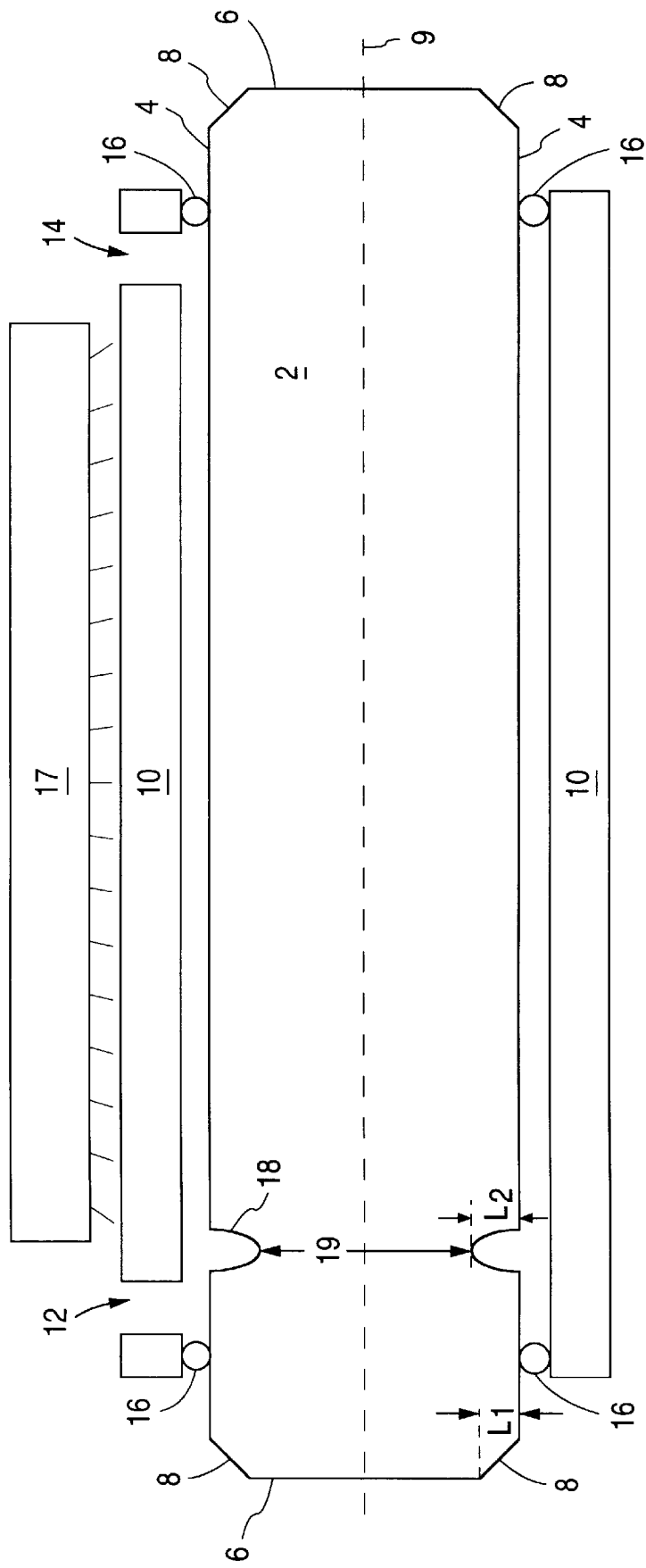
FIG. 1 is a side cross-sectional view of the gain medium of the present invention.
Figure 2:
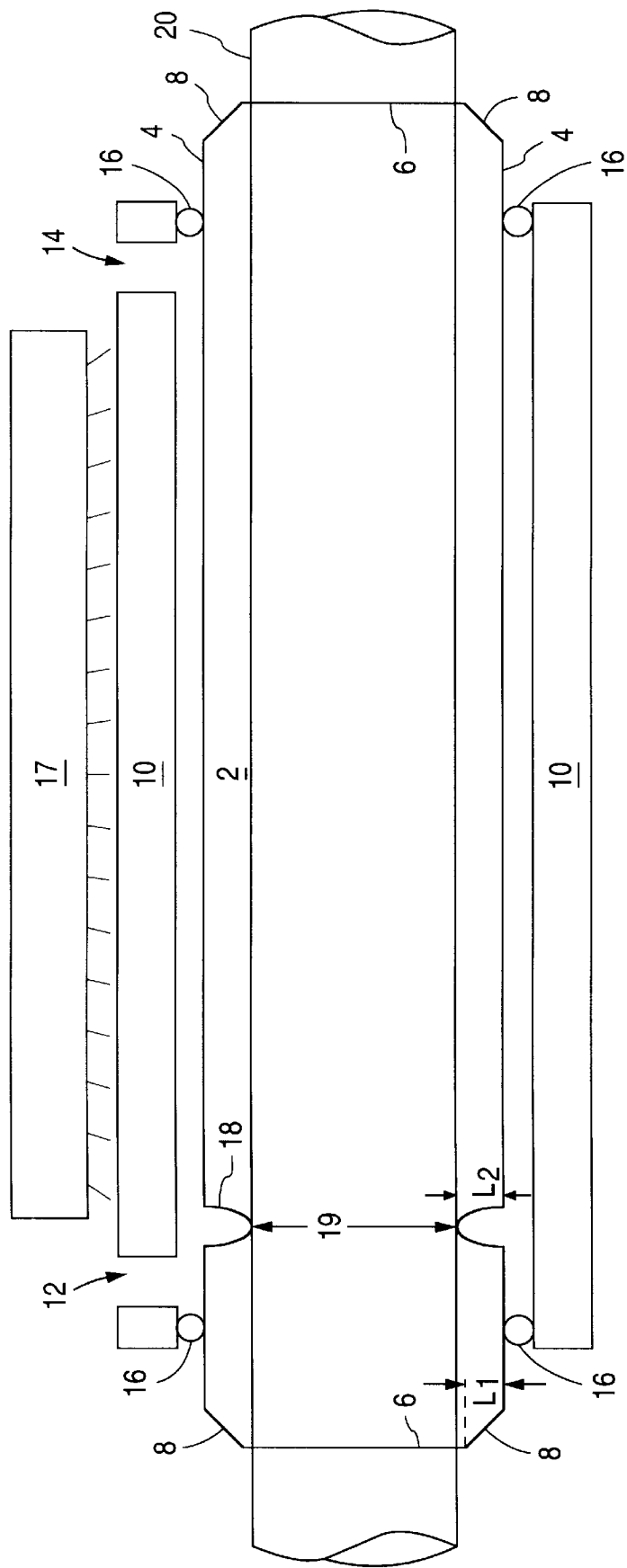
FIG. 2 is a side cross-sectional view of the gain medium illustrating a laser beam passing therethrough.

The preferred embodiment of the laser rod of the present invention is illustrated in FIGS. 1 and 2, which includes a cylindrically shaped laser gain medium (rod) 2 having an outer side surface 4, opposing end faces 6 and annular chamfer portions 8 at each end face. Chamfer portions 8 are angled surfaces formed between the side surface 4 and each end face 6. Chamfer portions 8 have a total radial depth of $L_1$ from the side surface 4 toward the central longitudinal axis 9 of laser rod 2.

The laser rod 2 illustrated in FIGS. 1 and 2 is shown disposed inside a cooling jacket 10 to facilitate flowing cooling fluid over the rod 2 for high power operation. The cooling jacket 10 has a fluid input port 12 and output port 14 for circulating cooling fluid, such as water, along the length of the laser rod side surface 4. O-rings 16 at each end of the cooling jacket 10 form a seal between the jacket 10 and rod 2 and prevent cooling fluid from leaking out onto the end faces 6. One or more lamp sources 17 are disposed adjacent the side surface 4 to optically excite laser rod 2, which generates an intracavity beam 20 that oscillates in the laser cavity (not shown). The cooling jacket 10 is made of a material that is transparent to the optical energy from the lamp source 17. The optical energy passes through cooling jacket 10 and the circulating cooling fluid therein to optically excite rod 2.

An annular groove 18 is formed in the outer surface 4 of laser rod 2. Groove 18 defines an internal limiting aperture 19 inside the rod 2 for the intracavity beam 20 traversing longitudinally therethrough. Groove 18 has a radial depth of $L_2$ toward the central longitudinal axis 9 of laser rod 2, which dictates how much of the rod's cross-sectional area can be filled by the intracavity beam 20.

The beam 20 can expand or be aligned toward the face edges and/or chamfer portion 8 up to the point where the beam hits the groove 18 forming the aperture 19, as illustrated in FIG. 2. The groove 18 prevents any further expansion or alignment of the beam 20 towards the face edge and/or chamfer portion 8. Therefore, for a substantially constant diameter beam 20 along the length of the laser rod 2, making the groove radial depth $L_2$ slightly greater than the chamfer radial depth $L_1$ causes the intracavity beam 20 to hit the aperture 19 before it can hit the edges of end faces 6 and/or the chamfer portions 8, thus preventing damage to the laser rod 2. For diverging intracavity beams, the radial depth $L_2$ and longitudinal position of groove 18 can be optimized to limit the intracavity beam 20 to an appropriate diameter necessary to prevent the beam 20 from hitting the end faces 6 and/or chamfer portions 8. In addition, the groove 18 may be formed with varying radial depths $L_2$ around the laser rod 2 resulting in a non-circular shape of aperture 19, which can be used to create an intracavity beam 20 having the desired cross-sectional shape as it passes through the laser rod 2.

Ideally, the groove 18 is formed in a portion of the rod side surface 4 over which the cooling fluid flows. The advantage of such a groove position is that the internal aperture 19 is then formed of laser rod material that is directly cooled by the cooling fluid, which can better withstand the incident high power intracavity beam compared to the end faces 6 and/or chamfer portions 8, or even other portions of the laser rod 2 near the rod ends that are not cooled by the cooling fluid. Since the O-ring 16 occupies at least the very ends of side surface 4, it is ideal to form groove 18 on a portion of the rod surface 4 that is between the two O-rings 16. Preferably, groove 18 is positioned near one of the O-rings to minimize interference by the groove 18 with the optical energy from the lamp 17 entering the laser rod 2.

Figure 3:
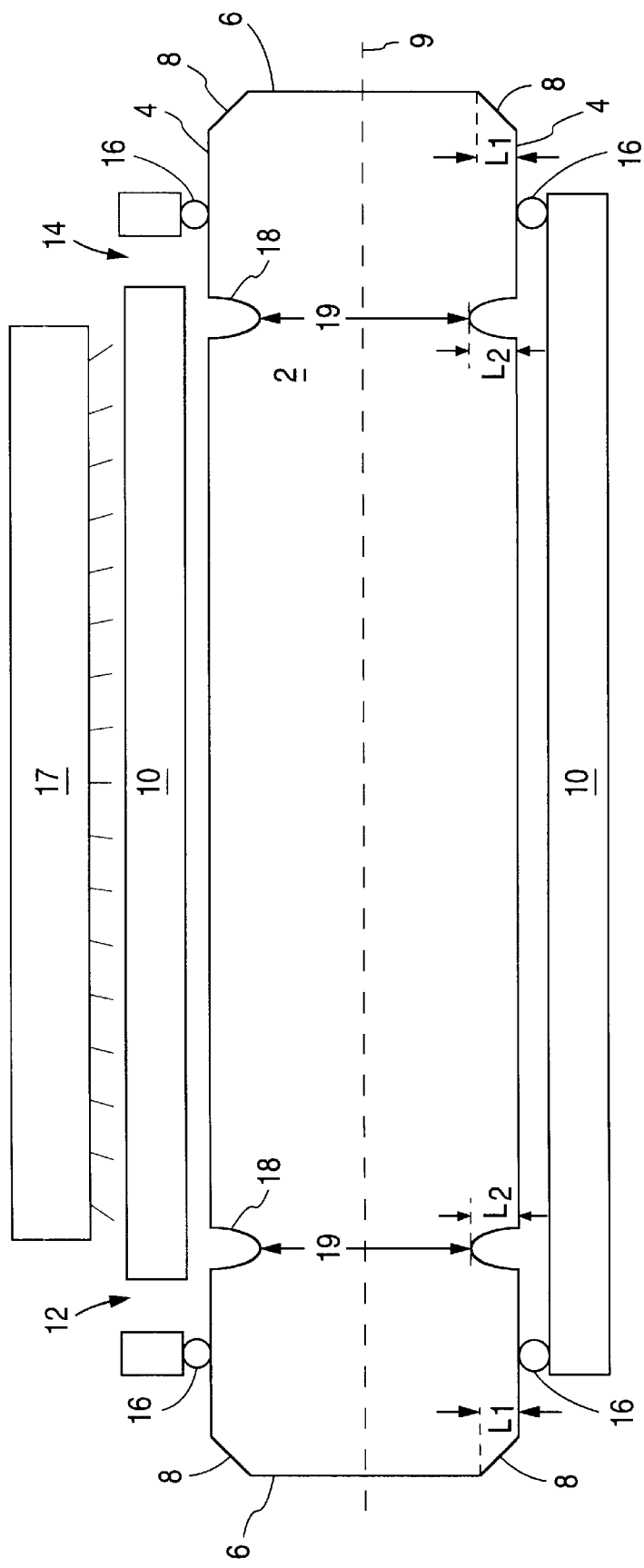
FIG. 3 is a side cross-sectional view of a second embodiment of the gain medium of the present invention.

FIG. 3 illustrates an alternate embodiment of the present invention, where the laser rod 2 has two annular grooves 18, one near each end of the laser rod 2. This embodiment is ideal for protecting each end face 6 of rod 2 from intracavity beams that either diverge inside the laser rod, or are significantly misaligned from the longitudinal axis 9 of the laser rod 2. Depending upon the intracavity beam characteristics and the dimensions of the end faces 6, the grooves 18 illustrated in FIG. 3 can have either the same or different radial depths.

The present invention has been developed for commercialization with an Alexandrite (Cr-doped, $BeAl_2O_4$) laser rod 2 that is 96 mm long and 4 mm in diameter with a single groove 18 formed therein. The chamfer has a radial depth of 0.003 inches, and the groove 18 has a radial depth of 0.005–0.006 inches. End faces 6 are substantially parallel to each other, and slightly non-normal to side surface 4 to prevent adverse reflections back into the laser resonant cavity. The cooling jacket 10 is made of fused silica. The Alexandrite rod 2 is pumped by an 800 watt xenon lamp source. The rod 2 and lamp source 17 are cooled with water circulating at 2 gallons per minute. The intracavity beam is Q-switched with over 0.7 joules of energy per 40 ns pulse, at a repetition rate of 10 Hz. The groove 18 is formed by grinding the groove 18 into the rod side surface.

It is to be understood that the present invention is not limited to the embodiments described above and illustrated herein, but encompasses any and all variations falling within the scope of the appended claims. For example, other optical sources can be used to excite the laser rod medium, such as another laser and/or laser diode. Further, the laser rod 2 can be end pumped through one or both faces instead of, or in conjunction with, side pumping through the side surface 4, in which case the annular groove 18 could also be used to prevent the pump beam from damaging the opposite end face. In addition, the laser rod of the present invention can be utilized in lower power laser systems, where the rod need not be cooled during operation. Other cooling methods, including air cooling, etc., can also be utilized with the present invention. Lastly, gain medium 2 need not have a circular cross-section, or be "rod shaped", or have chamfer portions 8. Gain medium 2 can be any shape wherein the groove 18 forms the aperture 19 that has a cross-sectional shape that prevents damage to the gain medium.

What is claimed is:

1. An improved gain medium for a laser cavity, comprising:

an elongated gain medium having an outer side surface and two opposing end faces;

an annular groove formed in the side surface, wherein the annular groove defines an annular aperture inside the gain medium, and wherein the end faces and the aperture each have a diameter, and the aperture diameter is smaller than at least one of the end face diameters; and a chamfer portion formed between the side surface and one of the end faces, the chamfer portion is an annular angled surface between the one face and the side surface so that the diameter of the one face is less than a diameter of the side surface, wherein the aperture diameter is less than the diameter of the one face.

2. An improved gain medium for a laser cavity, comprising:

an elongated gain medium having an outer side surface and two opposing end faces; and an annular groove formed in the side surface, wherein the annular groove defines an annular aperture inside the gain medium;

wherein the end faces and the aperture each have a diameter, and the aperture diameter is smaller than at least one of the end face diameters, and wherein the groove has a varying depth such that the annular aperture has a non-circular cross-sectional shape.

3. The gain medium of claim 2, wherein the gain medium outer side surface has a circular cross-sectional shape.

4. An improved gain medium for a laser cavity, comprising:

an elongated gain medium having an outer side surface and two opposing end faces; and an annular groove formed in the side surface, wherein the annular groove defines an annular aperture inside the gain medium;

wherein the end faces and the aperture each have a diameter, and the aperture diameter is smaller than at least one of the end face diameters, and wherein the gain medium is made of Alexandrite.

5. The gain medium of claim 4, wherein:

the annular groove is a first annular groove and the annular aperture is a first annular aperture; and the gain medium further comprising a second annular groove formed in the side surface which defines a second annular aperture inside the gain medium, the second annular aperture having a diameter that is smaller than a diameter of the other of the end faces.

6. A laser system comprising:

a resonant cavity;

a gain medium inside the cavity, the gain medium comprising:

a cylindrically shaped gain medium having an outer cylindrical side surface and two opposing end faces, and an annular groove formed in the side surface;

an energy source for exciting the gain medium to create a laser beam inside the cavity, wherein the laser beam passes longitudinally through the gain medium, and wherein the annular groove defines an annular aperture inside the gain medium for the laser beam having a diameter that is smaller than a diameter of the side surface; and a cooling jacket disposed around the gain medium to guide cooling fluid over the gain medium and to cool at least a portion of the gain medium side surface, wherein the groove is formed in the portion of the gain medium side surface that is cooled by the fluid flowing through the cooling jacket.

7. The laser system of claim 6, wherein the end faces each have a diameter, and the aperture diameter is smaller than at least one of the end face diameters.

8. A laser system comprising:

a resonant cavity;

a gain medium inside the cavity, the gain medium comprising:
   a cylindrically shaped gain medium having an outer cylindrical side surface and two opposing end faces, and
   an annular groove formed in the side surface;

an energy source for exciting the gain medium to create a laser beam inside the cavity, wherein the laser beam passes longitudinally through the gain medium, and wherein the annular groove defines an annular aperture inside the gain medium for the laser beam having a diameter that is smaller than a diameter of the side surface; and a chamfer portion formed between the side surface and one of the end faces, the chamfer portion is an annular angled surface between the one face and the side surface so that the diameter of the one face is less than the diameter of the side surface, wherein the aperture diameter is less than the diameter of the one face.

9. A laser system comprising:

a resonant cavity;

a gain medium inside the cavity, the gain medium comprising:
   a cylindrically shaped gain medium having an outer cylindrical side surface and two opposing end faces, and
   an annular groove formed in the side surface; and an energy source for exciting the gain medium to create a laser beam inside the cavity, wherein the laser beam passes longitudinally through the gain medium, and wherein the annular groove defines an annular aperture inside the gain medium for the laser beam having a diameter that is smaller than a diameter of the side surface;

wherein the groove has a varying depth such that the annular aperture has a non-circular cross-sectional shape.

10. A laser system comprising:

a resonant cavity;

a gain medium inside the cavity, the gain medium comprising:
   a cylindrically shaped gain medium having an outer cylindrical side surface and two opposing end faces, and
   an annular groove formed in the side surface; and an energy source for exciting the gain medium to create a laser beam inside the cavity, wherein the laser beam passes longitudinally through the gain medium, and wherein the annular groove defines an annular aperture inside the gain medium for the laser beam having a diameter that is smaller than a diameter of the side surface;

wherein the gain medium is made of Alexandrite.

11. The laser system of claim 10, wherein:

the annular groove is a first annular groove and the annular aperture is a first annular aperture;

the gain medium further comprising a second annular groove formed in the side surface which defines a second annular aperture inside the gain medium, the second annular aperture having a diameter that is smaller than a diameter of the other of the end faces.

* * * * *